(12) United States Patent
Ringe et al.

(10) Patent No.: US 11,119,961 B2
(45) Date of Patent: Sep. 14, 2021

(54) I/O COHERENT REQUEST NODE FOR DATA PROCESSING NETWORK WITH IMPROVED HANDLING OF WRITE OPERATIONS

(71) Applicant: Arm Limited, Cambridge (GB)

(72) Inventors: Tushar P. Ringe, Austin, TX (US); Jamshed Jalal, Austin, TX (US); Dimitrios Kaseridis, Austin, TX (US)

(73) Assignee: Arm Limited, Cambridge (GB)

( * ) Notice: Subject to any disclaimer, the term of this patent is extended or adjusted under 35 U.S.C. 154(b) by 103 days.

(21) Appl. No.: 16/655,403

(22) Filed: Oct. 17, 2019

(65) Prior Publication Data

US 2020/0125518 A1 Apr. 23, 2020

(30) Foreign Application Priority Data

Oct. 22, 2018 (EP) .................................... 18386031

(51) Int. Cl.
- *G06F 13/00* (2006.01)
- *G06F 13/40* (2006.01)
- *G06F 12/0811* (2016.01)
- *G06F 12/0817* (2016.01)
- *G06F 13/16* (2006.01)

(52) U.S. Cl.
CPC ...... *G06F 13/4013* (2013.01); *G06F 12/0811* (2013.01); *G06F 12/0828* (2013.01); *G06F 13/1647* (2013.01)

(58) Field of Classification Search
CPC .................................................. G06F 13/4013

USPC ...................................................... 710/26, 33
See application file for complete search history.

(56) References Cited

U.S. PATENT DOCUMENTS

2017/0371585 A1* 12/2017 Lazo ..................... G06F 3/0659
2018/0074709 A1* 3/2018 Dreyer ................... G06F 3/064

\* cited by examiner

*Primary Examiner* — Henry Tsai
*Assistant Examiner* — Dean Phan
(74) *Attorney, Agent, or Firm* — Leveque IP Law, P.C.

(57) ABSTRACT

A method and apparatus for data transfer in a data processing network uses both ordered and optimized write requests. A first write request is received at a first node of the data processing network is directed to a first address and has a first stream identifier. The first node determines if any previous write request with the same first stream identifier is pending. When a previous write request is pending, a request for an ordered write is sent to a Home Node of the data processing network associated with the first address. When no previous write request to the first stream identifier is pending, a request for an optimized write is sent to the Home Node. The Home Node and first node are configured to complete a sequence of ordered write requests before the associated data is made available to other elements of the data processing network.

18 Claims, 8 Drawing Sheets

| TX ID | STREAM ID | HEAD_V | TAIL_V | CHILD_PTR | COMP RCVD | EXP COMP ACK |
|---|---|---|---|---|---|---|
| 0 | 0x7 | 1 | 0 | 2 | 0 | 0 |
| 1 | 0x5 | 1 | 0 | 4 | 0 | 0 |
| 2 | 0x7 | 0 | 0 | 3 | 0 | 1 |
| 3 | 0x7 | 0 | 1 | - | 0 | 1 |
| 4 | 0x5 | 0 | 1 | - | 0 | 1 |
| 5 | 0x4 | 1 | 0 | 7 | 0 | 0 |
| 6 | 0x9 | 1 | 1 | - | 0 | 0 |
| 7 | 0x4 | 0 | 1 | - | 0 | 1 |
| 8 | 0x2 | 1 | 1 | - | 1 | 0 |

FIG. 9A

| TX ID | STREAM ID | HEAD_V | TAIL_V | CHILD_PTR | COMP RCVD | EXP COMP ACK |
|---|---|---|---|---|---|---|
| 5 | 0x4 | 1 | 0 | 7 | 0 | 0 |
| 6 | 0x9 | 1 | 0 | 9 | 0 | 0 |
| 7 | 0x4 | 0 | 1 | - | 0 | 1 |
| 8 | 0x2 | 1 | 1 | - | 1 | 0 |
| 9 | 0x9 | 0 | 1 | - | 0 | 1 |

FIG. 9B

| TX ID | STREAM ID | HEAD_V | TAIL_V | CHILD_PTR | COMP RCVD | EXP COMP ACK |
|---|---|---|---|---|---|---|
| 5 | 0x4 | 1 | 0 | 7 | 0 | 0 |
| 6 | 0x9 | 1 | 1 | 9 | 0 | 0 |
| 7 | 0x4 | 0 | 1 | - | 0 | 1 |
| 8 | 0x2 | 0 | 0 | - | 1 | 0 |
| 9 | 0x9 | 0 | 1 | - | 0 | 1 |
| 10 | 0x2 | 1 | 1 | - | 0 | 0 |

FIG. 9C

I/O COHERENT REQUEST NODE FOR DATA PROCESSING NETWORK WITH IMPROVED HANDLING OF WRITE OPERATIONS

CROSS-REFERENCE TO RELATED APPLICATIONS

This application claims priority to foreign patent application No. EP 18386031.1 filed on Oct. 22, 2018, the contents of which are incorporated herein by reference in their entirety.

BACKGROUND

Data Processing Networks comprise a number of nodes coupled via an interconnect structure. Nodes may provide processing capability or acts as bridges or connects to other devices such as memories, other networks, input/output (I/O) devices and other peripheral devices.

A system-on-a-chip (SoC) may contain many functional blocks. In order to facilitate modular design and reuse, various standardized protocols have been introduced to specify the interconnection and management of the functional blocks. This facilitates development of multi-processor designs with large numbers of controllers and peripherals.

An example of such a protocol is the 'Coherent Hub Interface®' (CHI®) of Arm Limited.

A protocol specifies, for example, how write operations are performed. Since multiple processors may share a common memory, the write protocol specifies how data coherence is maintained during a write operation. For example, the protocol ensures that no processor contains an out-of-date copy of the written data in a local cache.

When data is sent across a network, there is, in general, no guarantee that write data written in a particular order will be observed in the same order. For example, data written to different addresses may be handled by different Home Nodes with different utilizations. To provide a capability for ordered writes, a protocol may allow for streaming write flows designed to efficiently stream ordered writes from I/O coherent request nodes. These protocols guarantee order write observation (OWO). Such a property is needed to enable a network to use devices coupled by a high-speed serial bus such as a Peripheral Component Interconnect Express (PCIe) bus.

However, streaming write flow incurs an overhead in terms of messages and node resources. This overhead is incurred by all the writes going through the interface, which implements OWO property unless it is known in advance if a write is part of an ordered write sequence or not.

One approach to identify ordered streaming writes is modification of an interface to include additional signaling. However, this approach can be costly to implement.

Accordingly, there exists a need for a data processing network that enables ordered streaming write operations without incurring unnecessary overhead for non-ordered write operations and without the expensive of interface modification to include additional signaling.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

FIGS. 9A-9C show logical arrangement of memory as table at different times, in accordance with various representative embodiments.

DETAILED DESCRIPTION

Figure 1:
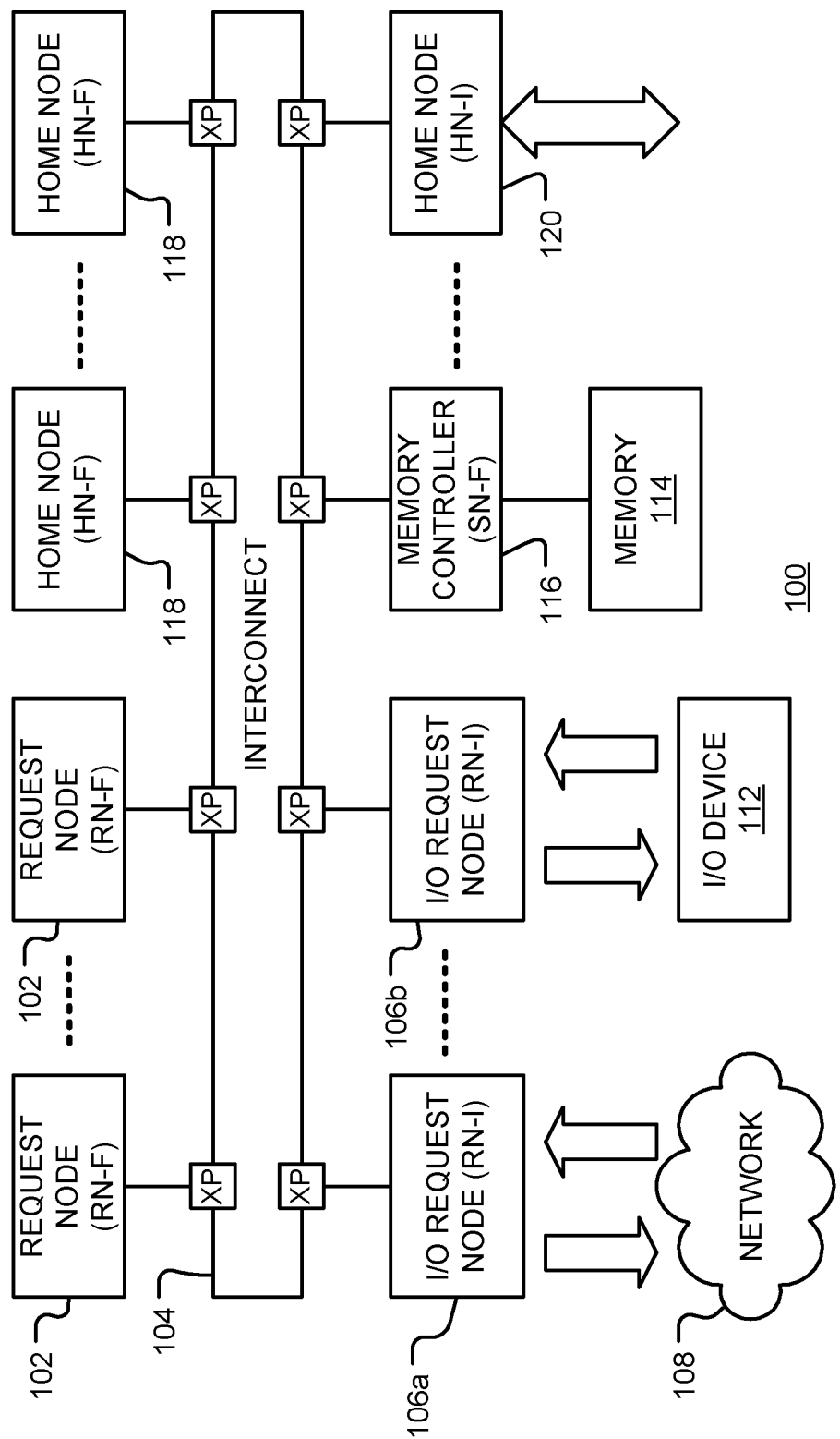
FIG. 1 is a block diagram of a data processing system, in accordance with various representative embodiments.

The various apparatus and devices described herein provide improved operation in a data processing network. In accordance with certain representative embodiments of the present disclosure, there is provided an improved Input/Output (I/O) Requesting Node (RN-I) of a data processing network.

While this disclosure is susceptible of embodiment in many different forms, there is shown in the drawings and will herein be described in detail specific embodiments, with the understanding that the present disclosure is to be considered as an example of the principles and not intended to be limited to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

A data processing network, such as a Network-on-a-Chip (NoC) or System-on-a-chip (SoC), may include the following elements:

Fully-coherent Request Node (RN-F): A fully-coherent master device such as a CPU core or core cluster. A Request Node is a node that generates protocol messages, including reads and writes, to the network interconnect.

I/O-coherent Request Node (RN-I) Bridge: An input/output-coherent master device acting as a bridge to devices located behind the RN-I bridge.

Fully-coherent Home Node (HN-F): A device, apparatus or module that is a Home Node for a designated region of memory, accepting coherent read and write requests from RN-Fs and generating snoops to all applicable RN-Fs in the system as required to support the coherency protocol. A Home Node receives protocol messages from RNs. Each address in the system has a Home which acts as the Point-of-Coherency (PoC) and Point of Serialization (PoS) for requests to that address. In a typical implementation, Homes for a range of addresses are grouped together as a Home Node. Each of these Home Nodes may include a system level cache and/or a snoop filter to reduce redundant snoops.

I/O Home Node (HN-I): A device that acts as a home-node for a memory mapped slave I/O subsystem, mainly responsible for ensuring proper ordering of requests sent into the slave I/O subsystem.

Fully-coherent Slave Node (SN-F): A fully-coherent device, such as a memory controller, that communicates with one or more HN-Fs that is solely a recipient of commands, limited to fulfilling simple read and write commands. A Slave Node receives and completes requests from Home Nodes and can be used for peripheral or main memory.

Protocol: The nodes exchange data and other information in messages according to a set of rules or procedures referred to as a protocol. Each message is sent as one or more information packets across the network interconnect fabric. The protocol may be implemented in the micro-architecture of the nodes, for example. An example of a coherent protocol is the Arm® AMBA® coherent hub interface (CHI) protocol of Arm Limited.

Transaction: A transaction, such as a read or write transaction, typically involves the exchange of multiple messages as specified in a given protocol.

FIG. 1 is a block diagram of a data processing system 100, in accordance with various representative embodiments. A number of processing core clusters 102 (referred to as Request Nodes (RN's)) are coupled to data resources via coherent interconnect 104. Data is received via input/output (I/O) requesting nodes (RN-I). In the example shown, RN-I 106a comprises a network interface controller (NIC) that receives data from network 108 and RN-I 106b receives data from I/O device 112. I/O device 112 may be coupled via a peripheral component interconnect express (PCIe) bus, direct memory access (DMA) unit, or network accelerator, for example. Data may be stored in one or more memory or storage devices 114 that are coupled to coherent interconnect 104 via one or more memory controllers or Slave Nodes 116. Home Nodes (HN) 118 and 120 may include system level caches. Each Home Node (HN) serves as a point of serialization and/or point of coherence for data stored at a given set of system addresses. A Home Node (HN-F), such as 118, may be a home for memory storage resources, while a Home Node (HN-I), such as 120, may provide an interface to memory mapped space or I/O resources. Data requested by a Request Node 102 may be retrieved from a system level cache of the HN or from a memory 114 via a memory controller 116. The memory controllers are referred to as Slave Nodes (SN's). The various elements interface to the interconnect at cross-points denoted as 'XP' in FIG. 1.

When data is sent across a network, there is, in general, no guarantee that data written in a particular order will be observed by other network elements in the same order. For example, data written to different addresses may be handled by different Home Nodes with different utilizations. A device such as I/O device 112 may provide ordered streaming data that is, in turn, provided, via I/O requesting node (RN-I) 106b, to other elements of the network. In order to provide a capability for ordered writes, a protocol may allow for streaming write flows designed to efficiently stream ordered writes from I/O coherent request nodes. These protocols guarantee order write observation (OWO). Such a property is needed to enable a network to use devices coupled by a high-speed serial bus such as a Peripheral Component Interconnect Express (PCIe) bus.

However, streaming write flow incurs an overhead in terms of messages and node resources. This overhead is incurred by all the writes going through the interface which implements OWO property unless it is known in advance if a write is part of an ordered write sequence or not.

The improved I/O Requesting Node (RN-I) disclosed herein provides fine-grained control over write operations by dynamically isolating same-ID write streams from unique-ID write operations. Only write operations that are part of the same-ID stream are sent with streaming ordered flow while unique-ID write operations go out with optimized (low-overhead) protocol flow. This approach results in:

a. Minimizing the number of response messages on Interconnect.
b. Minimizing the transaction lifetime at Home Nodes.
c. Removal of overhead associated with delayed observation of write data.
d. Minimizing the unnecessary data movement on Interconnect.

The overall benefit is improved system bandwidth and reduced power consumption.

In accordance with an embodiment of the disclosure, a protocol is modified to provide streaming ordered write transactions. This provides efficient streaming ordered writes from I/O coherent request nodes (RN-I's) and provides an ordered write observation (OWO) property. This property supports the strong ordering requirements of PCIe posted writes, for example, having the same stream ID's and helps to maintain high bandwidth in the interconnect. However, streaming write flow comes with an overhead and this overhead is incurred by all the writes going through the interface which implements OWO property In one implementation, streaming write flow works by sending Write requests back to back, without any dependency, and an 'enable observation' message (EN_OBS) is sent in order to enable the new data to be observed in the data processing network. This ensures that write data is observed in the correct order. This flow may be cancelled. To enable younger write operations to be cancelled, the interconnect may create a reverse dependency where the older write is waiting for younger writes to make forward progress. Streaming write functionality may be added to an existing protocol that provides for the writing of incomplete or partial cache lines. In such protocols, the home node (HN-F) may send appropriate snoops for to retrieve old data and preserve a copy of the old data in case of write cancellation.

Figure 2:
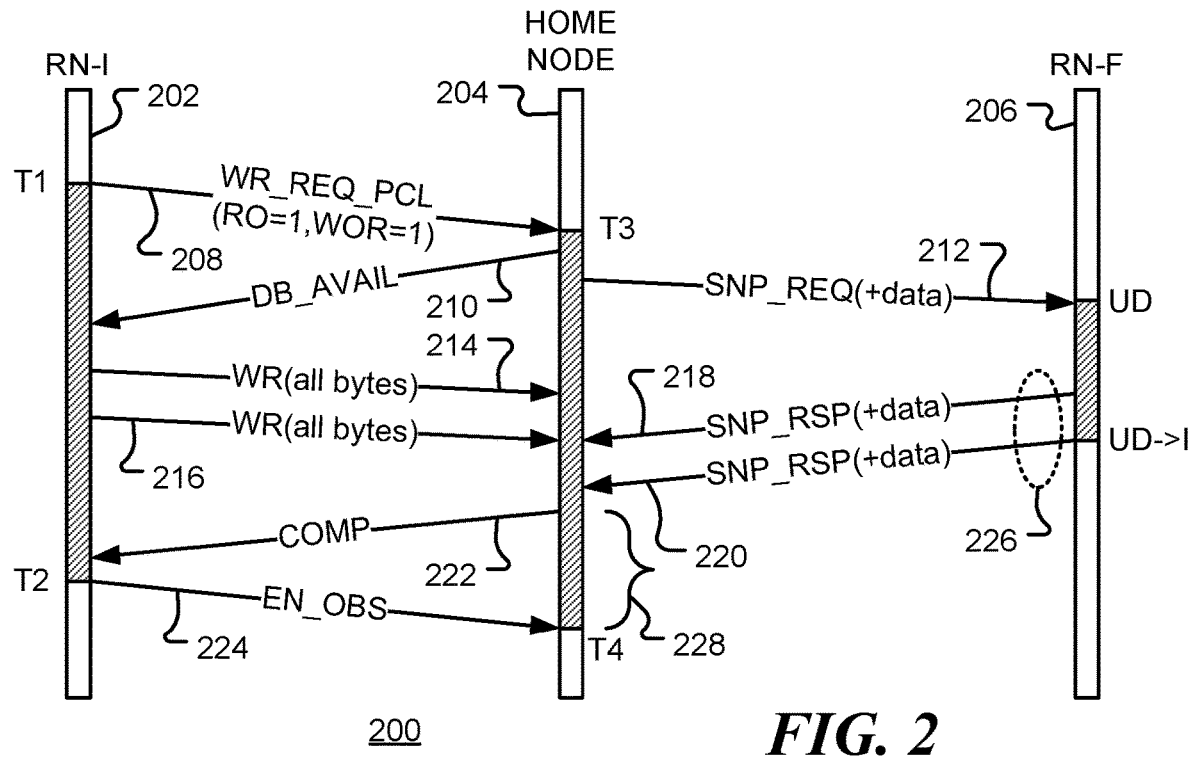
FIG. 2 is a transaction flow diagram for an ordered streaming write transaction in a data processing network.

FIG. 2 is a transaction flow diagram 200 for an ordered streaming write transaction in a data processing network. In FIG. 2, vertical bars 202, 204 and 206 show time lines for an I/O Requesting Node (RN-I), Home Node and fully coherent Requesting Node (RN-F), respectively, with time flowing from top to bottom. At time T1, Request Node RN-I issues write request 208 to the Home Node for data to be written to a data address. The request indicates that the data to be written is part of an ordered stream. For an ordered stream, the Home Node maintains copies of the data and does not allow the data to be observed until all older data is available. An ordered write may be cancelled before completion. When this occurs, the Home Node should be able to restore the data to its state before the write began.

Another situation in which the Home Node makes a copy of the data is when the data to be written is only part of a cache line. In that case, the rest of the cache line must be retrieved from a local cache or main memory. In the embodiment shown, this existing Home Node protocol is be used to cause the Home Node to maintain a copy of the data, whether the data is a complete cache line or only a partial cache line (PCL). The request 'WR_REQ_PCL', indicates that the Home Node should perform a partial cache line write (without allocating into L1 or L2 caches) and maintain copies of the data. The write request also indicates to the Home Node that copies of the data to be written should be retained until the RN-I indicates that all data has been written. In the implementation shown, this is done via a, 'write observation required' (WOR) flag in request 208.

The 'request order' (RO) flag is set to indicate that order is to be maintained.

When the Home Node is ready to receive the data to be written, the Home Node sends response 210 (DB_AVAIL) back to the RN-I to indicate that a data buffer is available for receiving the data. Response 210 may include an identifier of the buffer. The Home Node checks its snoop filter to determine if any node has a copy of the data at the indicated address in its local cache. If, as is the case in FIG. 2, node RN-F has a copy of the data (a snoop filter 'hit'), snoop request 212 is sent to the node (RN-F) to request the data. On receipt of the request, the RN-F changes the coherence state of the data in its local cache to 'unique dirty' (UD). The RN-I sends the data to be written in messages 214 and 216 to the Home Node and the RN-F sends the previous data at the address in messages 218 and 220 (the data is sent in two flits in this example, but in general the number of flits needed is a function of the bus width and the cache line length). When data is sent with a partial request, the message may include a 'byte enabled' (BE) field that indicates which bytes of data in the message are valid. When all bytes are valid, the BE field may be set to all ones, indicating that all bytes are valid. Once the data has been sent from the RN-F to the Home Node, the RN-F changes the coherence state of the data in its local cache from 'unique dirty' (UD) to 'invalid' (I).

At this point, the Home Node has the new data (full or partial cache lines) and the old data and so sends completion (COMP) message 222 to the RN-I. However, some of the data in the ordered write may have been targeted to system addresses assigned to other Home Nodes. The RN-I verifies that transactions with all other Home Nodes are completed before sending final 'enable observation' (EN_OBS) message 224 to the Home Node. The Home Node may then release its resources.

The write request, the completion (COMP) message and the enable observation (EN_OBS) message are each tagged with a transaction identifier. Thus, the RN-I can record the write request as completed. This information may be checked by subsequent, younger, writes. Similarly, the Home Node can associate the EN_OBS message with a corresponding write request and release resources associated with that request.

Thus, the duration of the transaction is T1-T2 for the Request Node and T3-T4 for the Home Node.

The embodiment shown in FIG. 2 leverages an existing Home Node protocol. However, while it is required to retain copies of data to be written until the transaction complete, the data transfers 218 and 220 are not required when the ordered writes are complete cache lines. Thus, in a further embodiment, the protocol is further amended to modify the behavior of the Home Node.

While this approach enables ordered writes, the resources at the Home Node are in use for the period 226. For independent writes, it is not necessary to wait for observation to be enabled by message 224. Thus, Home Node utilization in increased. Further, when the writes are full cache lines, it is not necessary to obtain copies from the RN-F, so messages 228 are unnecessary. This is illustrated in FIG. 3.

Figure 3:
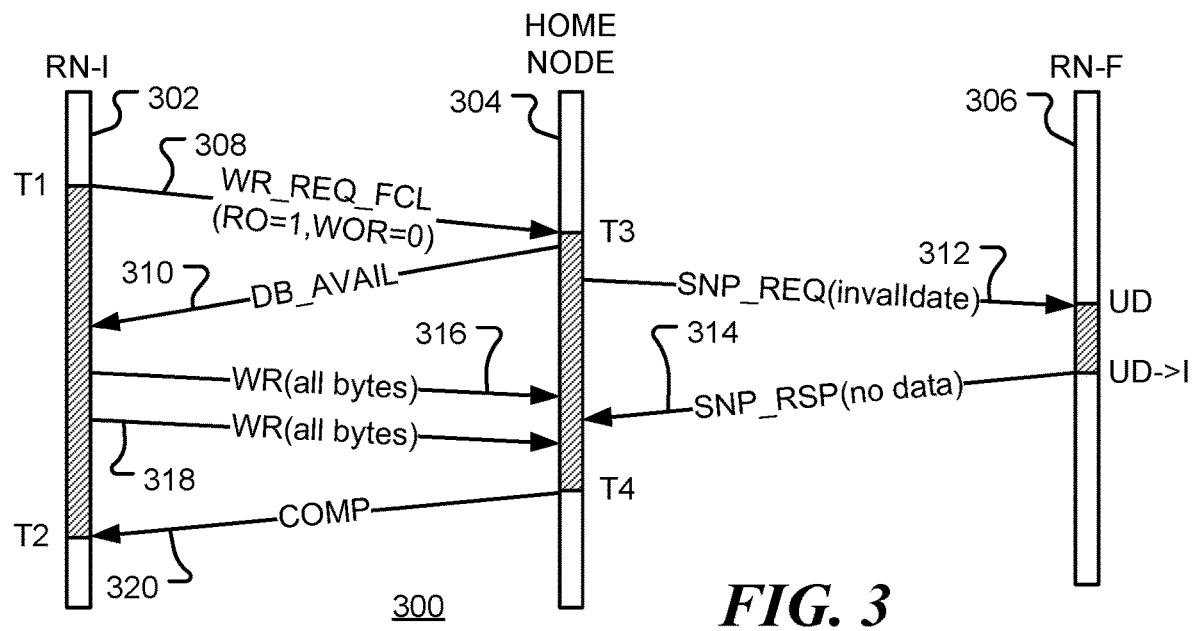
FIG. 3 is a transaction flow diagram for an independent (non-ordered) write transaction in a data processing network.

FIG. 3 is a transaction flow diagram 300 for an independent (non-ordered) write transaction in a data processing network. In FIG. 3, vertical bars 302, 304 and 306 show time lines for an I/O Requesting Node (RN-I), Home Node and fully coherent Requesting Node (RN-F), respectively, with time flowing from top to bottom. At time T1, Request Node RN-I issues write request 308 to the Home Node for data to be written to a data address. The request indicates that the data to be written is not part of an ordered stream. In this embodiment, this is indicated by the issuance of a WR_REQ_FCL command to write a full cache line (FCL). In the protocol of the Home Node, this indicates that a complete or full cache line is to be written. This new data will replace any previous copies of the data. When the Home Node is ready to receive the data to be written, is sends response 310 (DB_AVAIL) back to the RN-I to provide a data buffer identifier of a data buffer that is available for receiving the data. The Home Node checks its snoop filter to determine if any node has a copy of the data at the indicated address in its local cache. If, as is the case in FIG. 2, node RN-F has a copy of the data (a snoop filter 'hit'), snoop request 312 (SNP_REQ(invalidate)) is sent to the node (RN-F) to inform it that the copy of the data in its local cache is no longer valid and should be marked as such. On receipt of the request, the RN-F changes the coherence state of the data in its local cache to 'unique dirty' (UD). The RN-F acknowledges the message in snoop response (SNP_RSP(no data)) message 314 but does not return any data. Once the snoop response has been sent from the RN-F to the Home Node, the RN-F changes the coherence state of the data in its local cache from 'unique dirty' (UD) to 'invalid' (I). The RN-I sends the data to be written in data messages 316 and 318. Upon receipt of the data and completion of the coherence operations, the Home Node sends completion (COMP) message 320 to the RN-I. Thus, compared that the ordered write transaction shown in FIG. 2, the independent write transaction shown in FIG. 3 utilizes the Home Node for a shorter period (duration 226 in FIG. 2) and does not require data to transferred from RN-F (data messages 228 in FIG. 2). Thus, the independent write transaction is also referred to as an 'optimized' write transaction.

Figure 4:
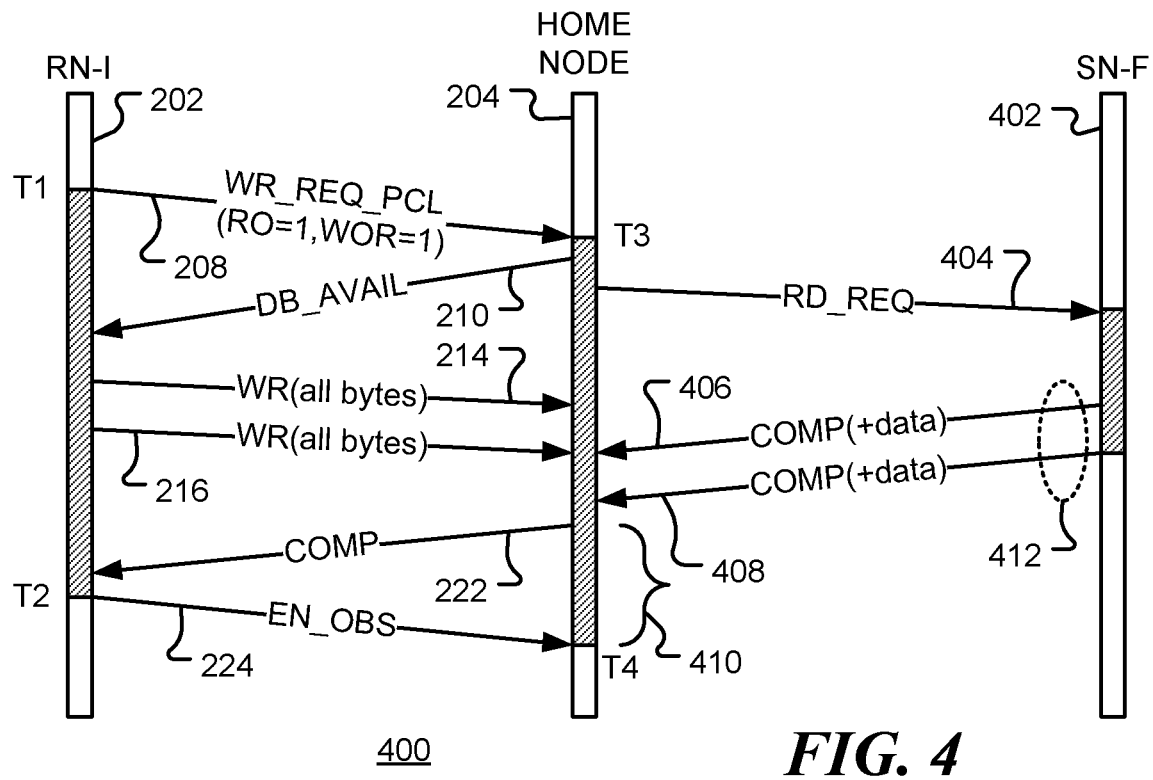
FIG. 4 shows an ordered write transaction in accordance with various representative embodiments.
Figure 5:
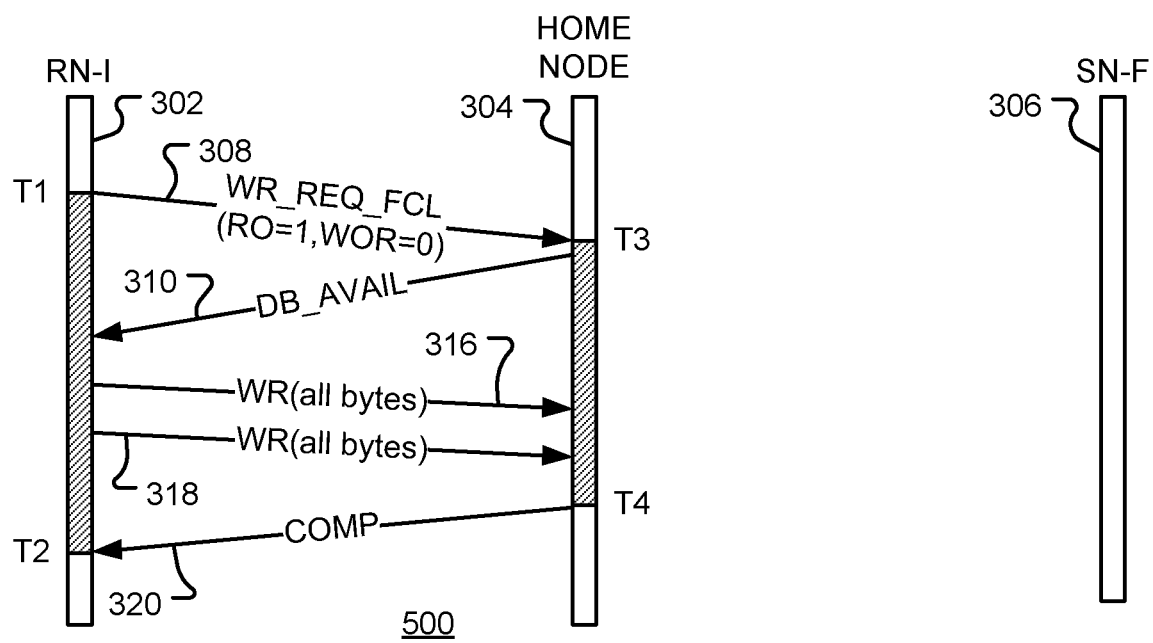
FIG. 5 shows an independent (non-ordered) write transaction, in accordance with various representative embodiments.

FIGS. 2 and 3 show an embodiment of the disclosure for write transactions where there is a snoop filter hit. FIGS. 4 and 5 show the embodiment for write transactions where there is a snoop filter miss.

FIG. 4, in common with FIG. 2, shows an ordered write transaction in accordance with certain embodiments of the disclosure. The actions of the RN-I are the same as in FIG. 2, but in this example, the Home Node's snoop filter indicates that no copies of data at the address to be written exist in any local cache. Accordingly, the data is retrieved from via a Slave Node (SN-F). Vertical bar 402 indicates a time-line for the Slave Node. Upon the receipt of request 208, the Home Node sends a read request (RD_NO_SNP) 404 to the Slave Node requesting a copy of the current data at the address to be written. The SN-F responds with the requested data in data messages 406 and 408. At this point, the Home Node has the new data (full or partial cache lines) and the old data and so sends completion (COMP) message 222 to the RN-I. When completion messages have been received from all Home Nodes associated with older requests with the same stream ID, the RN-I sends 'enable observation' message 224 to the Home Node.

FIG. 5, in common with FIG. 3, shows an independent (non-ordered) write transaction in accordance with certain embodiments of the disclosure. The actions of the RN-I are the same as in FIG. 3, but in this example, the Home Node's snoop filter indicates that no copies of data at the address to be written exist in any local cache. Since no copies of the data are required (the data is a full cache line and there are no younger write requests to be cancelled), no copies of data are needed. Accordingly, there is no need to retrieve current data at the address and there are no coherence actions required. No actions are required by SN-F (as indicated by time line 306). Compared, to the independent or optimized transaction shown in FIG. 5, the ordered transaction shown in FIG. 4 occupies the Home Node for an additional duration (410 in FIG. 4) and does not use data transfer (412 in FIG. 4) from the Slave Node.

The present disclosure recognizes two important properties of streaming write flow. Firstly, observation for oldest (first) write in a stream of writes with the same stream identifier does not need to be controlled. Data observation need only ensure that a younger write is not observed before an older write. Secondly, the oldest write in a stream of writes with the same stream identifier never needs to be canceled, since cancellation is only required for younger writes in case of deadlock (where a younger write is cancelled to enable an older writes to make forward progress).

The present disclosure exploits the above properties of streaming write flow. In one embodiment, an incoming write received at an interface of an RN-I is examined to decide if the write is part of a stream of writes the same stream ID. That is, to decide if there are any older writes outstanding in RN-I with same stream ID. If older writes exist with same stream ID, the current write is considered part of same-ID chain or stream and the write is issued to the interconnect with an indication that it is part of a streaming write flow. However, if no older write exists with same stream ID, the current write is considered the head of a same stream ID and the write is issued to the interconnect with an indication that it is an independent write (since the head of a stream requires no special treatment and may be treated in the same way as an independent write).

Figure 6:
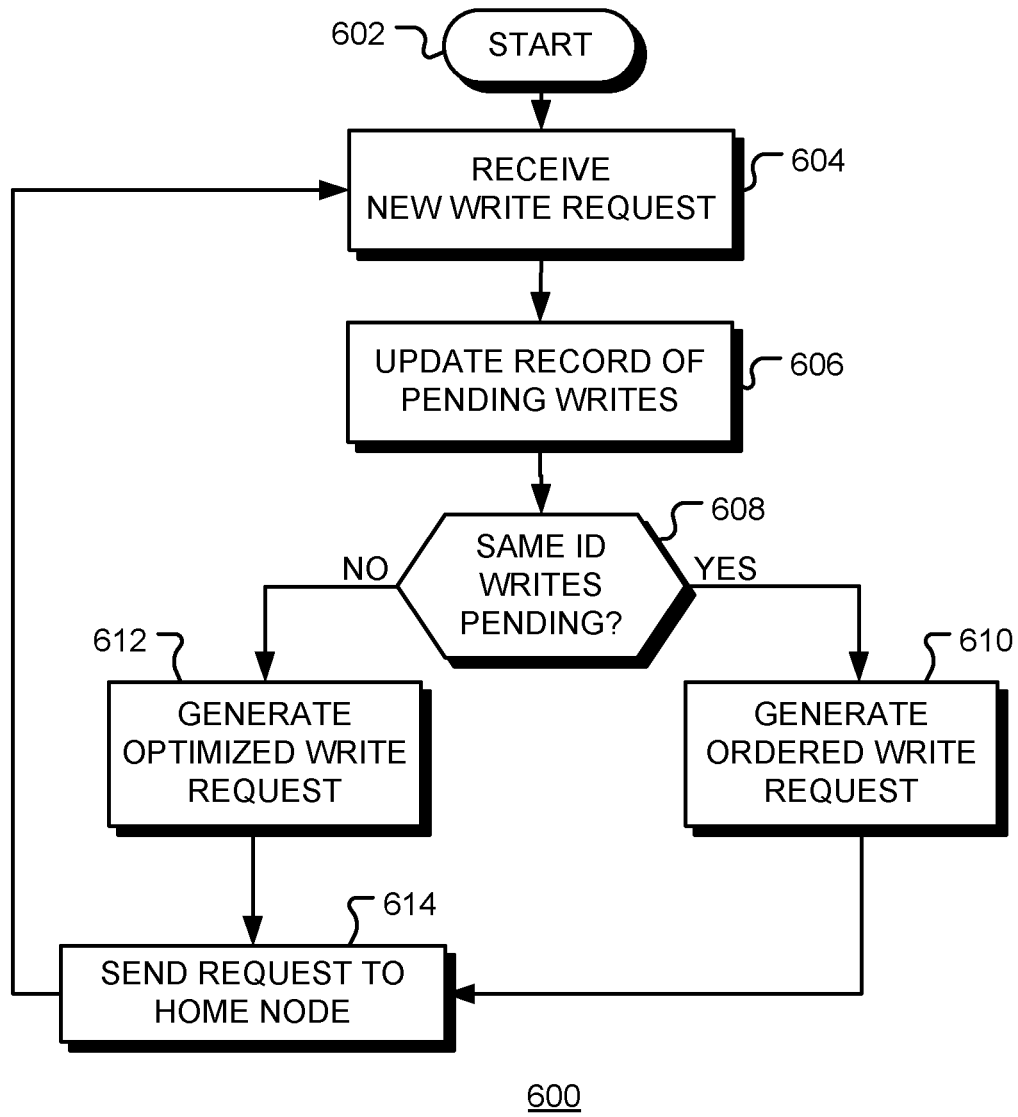
FIG. 6 is a flow chart of a method for processing write requests in a data processing network, consistent with various representative embodiments.

FIG. 6 is a flow chart of a method 600 for processing write requests in a data processing network, consistent with embodiments of the disclosure. Following start 602, an RN-I receives a new write from an I/O device 604. Each received write request is tagged with a stream identifier. For example, the Advanced eXtensible Interconnect (AXI®) protocol of Arm® Limited provides an AXI chain identifier. The requests are recorded as pending 606 to enable the RN-I to keep track of which write requests are incomplete. At decision block 608, the RN-I searches the record of pending write requests to determine if the write request to be issued has the same stream identifier as any other pending requests. In one embodiment, the record is stored in a content addressable memory (CAM) to facilitate fast searching. If other write requests with the same stream identifier are pending, as depicted by the positive branch from decision block 608, a request for an ordered or streaming write is generated by the RN-I, 610. Otherwise, as depicted by the negative branch from decision block 608, a request for an independent (non-ordered) write is generated, 612. Since the independent write operation does not incur the overhead associated with an ordered write operation, the independent write request is referred to herein as an 'optimized write'. At block 614, the generated write request is sent, via the interconnect, to the Home Node associated with the write address. In this manner, the overhead of ordered writes is avoided for independent write requests, while ordering is preserved for ordered writes.

In accordance with certain embodiments, the rules for ordered write transactions are:

1) Copies of old data should be retained to allow cancellation. For example, writes may use a *_PCL Opcode. If a *_FCL Opcode is provided by the protocol, it must be downgraded to *_PCL Opcode.
2) The I/O requesting node should indicate completion by all Home Nodes used in the transaction. For example, an 'enable observation message' (EN_OBS) should be added to the protocol as an additional message.
3) Ordered writes should wait for all utilized Home Nodes to indicate readiness. For example, the RN-I should wait for all previous 'data buffer available' (DB_AVAIL) messages to arrive before sending the data to be written.
4) Ordered writes should wait for completion (COMP) messages from all participating Home Nodes to arrive before sending 'enable observation' (EN_OBS) messages to the Home Nodes.
5) The Home Node should wait for the 'enable observation' (EN_OBS) message from the RN-I before making the written data observable to other readers in the system. This is achievable since all requests for the data are directed to the Home Node.

Figure 7:
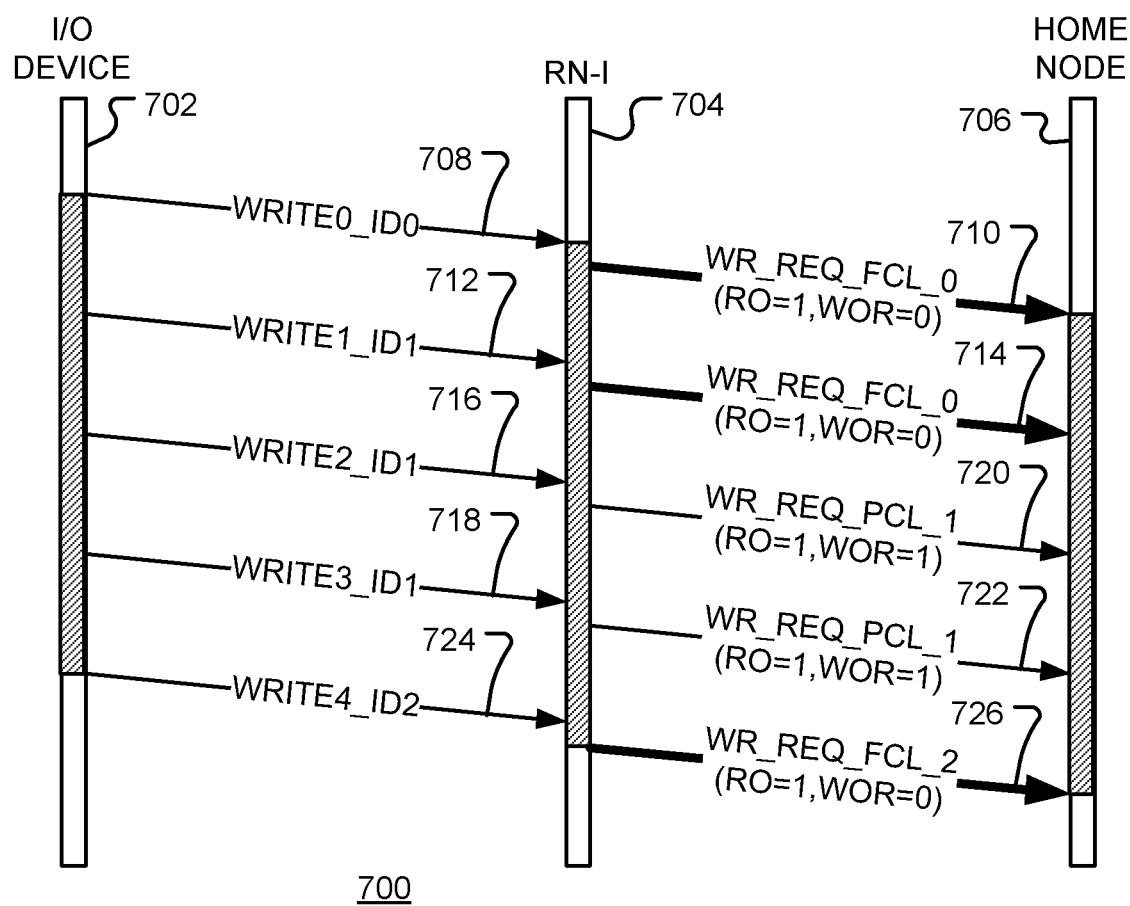
FIG. 7 is a transaction flow diagram showing a sequence of write transaction having a mix of streaming (ordered) and independent (non-ordered) writes.

FIG. 7 is a transaction flow diagram 700 showing a sequence of write transaction having a mix of streaming (ordered) and independent (non-ordered) writes. In FIG. 7, vertical bars 702, 704 and 706 show time lines for an I/O device, an I/O Requesting Node (RN-I), Home Node and a Home Node respectively, with time flowing from top to bottom. When the RN-I receives write message 708, with stream ID 0, from the I/O device, there are no pending writes, so the request 710 to the interconnect is for an optimized write, as indicated by the *_FCL opcode. When the RN-I receives write message 712, with stream ID 1, from the I/O device, there are no pending writes with the same ID, so the request 714 to the interconnect is for an optimized write.

When the RN-I receives write messages 716 and 718, both with ID 1, from the I/O device, there is a pending write with the same stream ID, so the corresponding requests 720 and 722 to the interconnect is for a streaming write, as indicated by the *_PCL opcode.

Finally, when the RN-I receives write message 724, with stream ID 2, from the I/O device, there are no pending writes with the same stream ID, so the request 726 to the interconnect is for an optimized write, as indicated by the *_FCL opcode.

Figure 8:
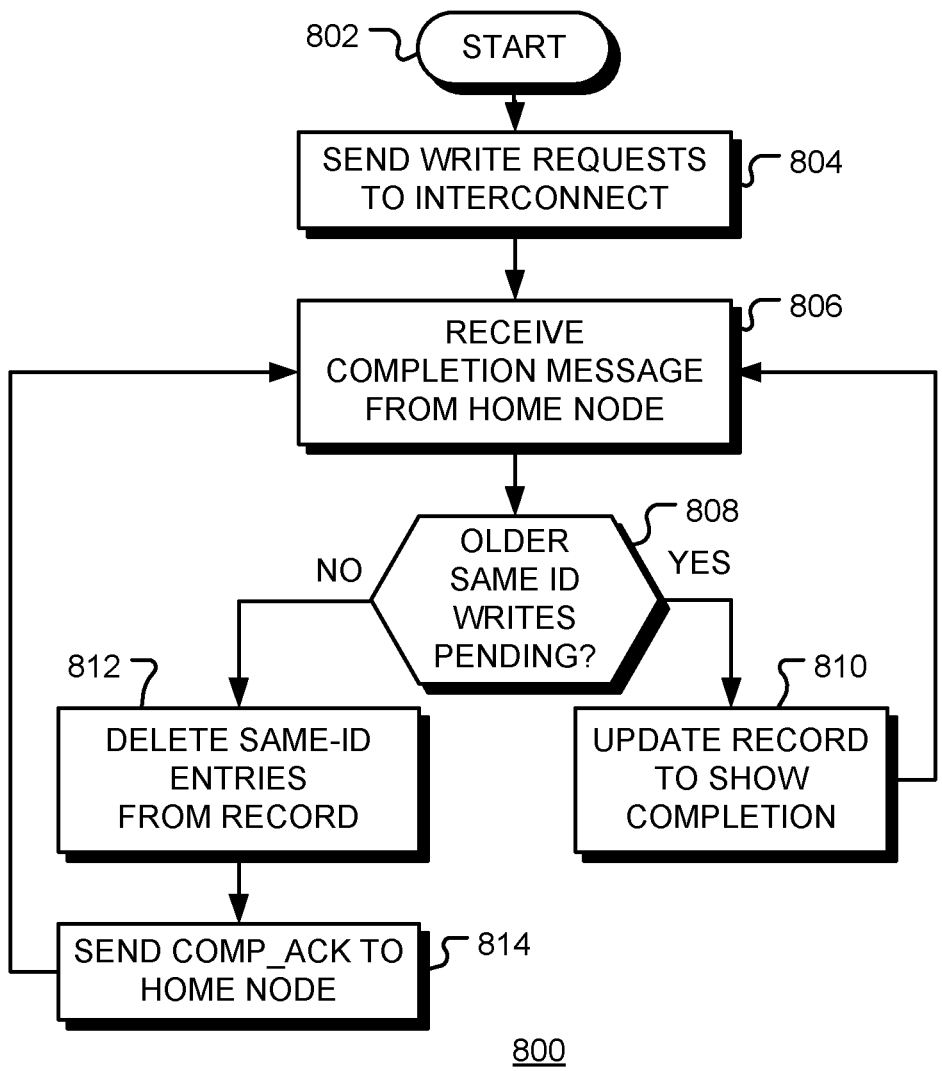
FIG. 8 is a flow chart of a method of operation of an I/O Request Node, in accordance with various representative embodiments.

FIG. 8 is a flow chart of a method 800 of operation of an I/O Request Node (RN-I), in accordance with embodiments of the disclosure. Following start block 802, at block 804, the RN-I sends a number of write requests to one or more Home Nodes of the data processing network. The RN-I maintains a record of pending write requests. The record may be a table stored in a content addressable memory, for example. At block 806, the RN-I receives a completion (COMP) message from a Home Node, indicating that an earlier write request has been completed. At decision block 808, the RN-I searches the record of pending writes to determine if any older write with the same stream ID is pending. If there are same-ID writes pending, as depicted by the positive branch from decision block 808, the record is updated at block 810 to indicate that the earlier write has been completed. However, the write request remains 'pending' when older writes with the same stream ID are incomplete. If there are no same-ID writes pending, as depicted by the negative branch from decision block 808, the ordered write is complete (i.e. there are no outstanding older writes) and all entries in the record with the same ID are deleted at block 812. At block 814, the RN-I sends a complete-acknowledgement message to all Home Nodes involved in the chain of writes to inform that the written data may be observed by other elements in the network.

The same-ID write requests may be recorded as a linked list, for example.

FIGS. 9A-9C show logical arrangement of memory as table 900 at different times, in accordance with representative embodiments of the disclosure. It will be apparent to those of ordinary skill in the art that similar or equivalent information to that stored in table 900 may be maintained in other ways, such as a linked list, without departing from the present disclosure. Table 900 is maintained by an RN-I and provides a record of write requests. Each row of the table corresponds to a write request and comprises field 902 containing a transaction identifier (TX_ID) or other entry identifier, field 904, containing the stream ID (STREAM_ID) of a request received at the RN-I, field 906 indicating when the request is at the head of a sequence of ordered requests, field 908 indicating when the request is at the tail of a sequence of ordered requests, field 910 containing a pointer (in this case the transaction identifier) to a child (or newer) request in an ordered sequence of requests, field 912 indicating when a completion (COMP) message has been received for the transaction and field 914 indicating when an observation enablement message is expected for the requested transaction. The table may be a content addressable memory (CAM) for example, to facilitate searching by stream identifier.

FIG. 9A shows table 900 at a first time. The row with transaction ID 0 in field 902 is for stream ID 0x7. The value '1' in field 906 indicates that this request is at the head (i.e. the first or oldest request) of an ordered sequence of requests. The value '0' in field 908 indicates that this request is not at the tail of the ordered sequence. This indicates that the sequence contains at least one other request. The value '2' in field 910 indicates that next request in the sequence is in the row with transaction ID '2'. The table indicates that the requests with transaction ID's 0, 2, 3 form an ordered sequence with TX_ID 0 at the head and TX_ID 3 at the tail. Other sequences are {TX_ID 1, TX_ID 4} and {TX_ID 5, TX_ID 7}.

FIG. 9B shows the lower part of table 900 after receipt of a new request assigned to TX_ID 9. The stream ID is 0x9 (where '0x' indicates a hexadecimal number). On receipt, the table is searched to discover that entry with TX_ID 6 has been received previously with the same stream ID. This entry that is designated as the tail of the sequence and has not been completed. The new entry is treated as part of an ordered sequence. Accordingly, TX_ID 6 is no longer the tail of a sequence, so field 908 is changed to '0', and '9' is placed in field 910 to indicate that TX_ID 9 follows TX-ID 6. The changes are indicated by the bold lines in the figure. New entry TX_ID 9 is indicated, in field 908, to be the tail of the sequence. Also, since this is not the first transaction in the sequence, field 914 is set to '1' to indicate that an 'enable observation' message is expected for the request to ensure that data is not observable before older requests.

FIG. 9C shows the lower part of table 900 after receipt of a second new request assigned, to TX_ID 10. The stream ID is 0x2. On receipt, the table is searched to discover that entry with TX_ID 8 has been received previously with the same stream ID. However, TX_ID 8 has already been completed, as indicated by field 912. Accordingly, TX_ID 8 is no longer part a sequence, so entries 906 and 908 are changed to '0'.

The changes are indicated by the bold lines in the figure. New entry TX_ID 10 is indicated, in field 908, to be both the head and the tail of a new sequence. Also, since this is now the first transaction in the sequence, field 914 is set to '0' to indicate that an 'enable observation' message is expected for the request and an optimized request can be sent.

On receipt of a new request received at the RN-I, the table is checked to determine if an entry exists for which (a) the stream ID matches the incoming stream ID and (b) the entry is indicated as the tail of an ordered sequence and (c) no completion message has been received from the home node for the entry. If all three conditions are met, the new request is designated as a child of the matched entry and is sent to the interconnect as an ordered write request for which an 'enable observation' message is expected.

When a cancellation request is received, the table is checked to determine if any older requests exist in the sequence and those requests are cancelled also.

When a completion message is received from a Home Node, table 900 is searched to identify the entry with a matching TX_ID. If an 'enable observation' message is expected, as indicated by field 914, the table is searched using fields 912 to see if all older writes have been completed. If all older writes have been completed, an 'enable observation' message is sent to the Home Node. Otherwise, field 912 is set to indicated receipt of the completion message.

Figure 10:
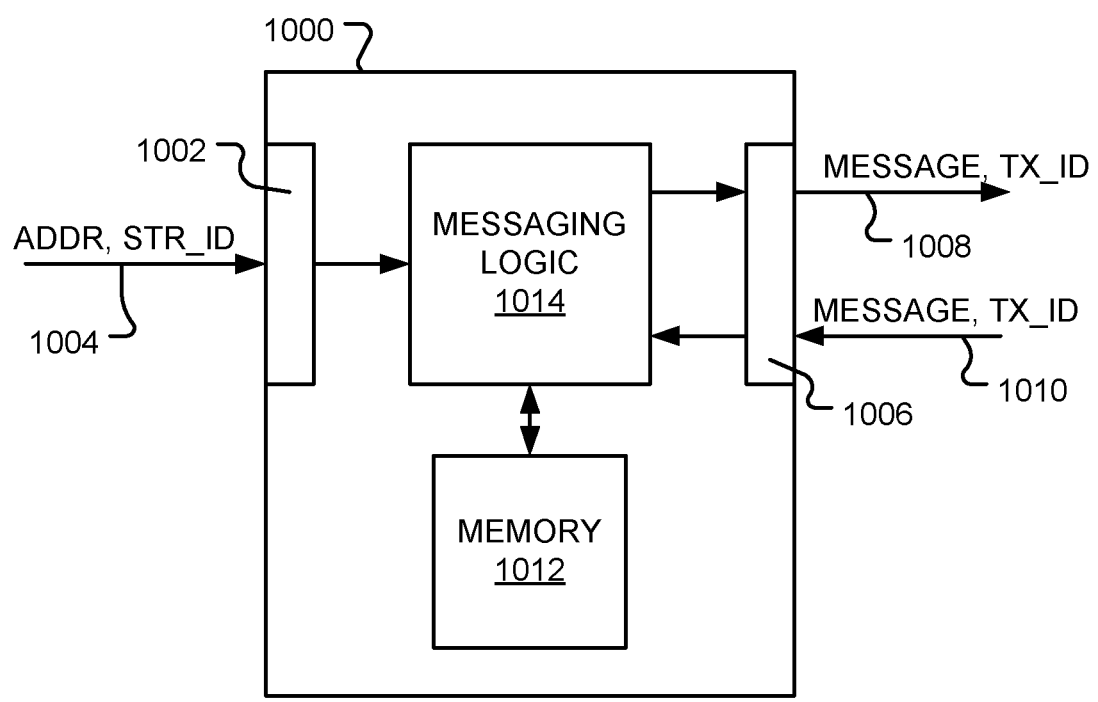
FIG. 10 shows a network input node, in accordance with various representative embodiments.

FIG. 10 shows a network input node 1000, in accordance with embodiments of the disclosure. Input node 1000 may be an I/O requesting node (RN-I), for example. Input node 1000 includes a first interface 1002 configured to receive first write requests 1004 from a first device, such as an I/O device. Each first write request 1004 includes a stream identifier (STR_ID) and a target address. Write requests having the same stream identifier are received in order and it is desirable that this order be maintained in the network. That is, a device of the network should not be able to observe a data in a particular request until all older data in the stream can also be observed.

Input node 1000 also includes second interface 1006 configured to send messages 1008 to a data processing network and receive messages 1010 from the network. In particular, second interface 1006 is configured to couple to a Home Node of the data processing network and able to send second writes request, each corresponding to a first write request to the Home Node. Each message includes a transaction identifier (TX_ID) so that messages associated with the same transaction may be associated with each other.

Input node 1000 also includes memory 1012, configured to store a record of first and second write requests and an order to the first write requests. The record allows transactions associated with the same stream (same stream identifier) to be identified and also records the order in which the first write requests 1004 were received at first interface 1002.

Input node 1000 also include messaging logic 1014 configured for receiving a first write request 1004 from the first interface 1002, the write request directed to a first address in the data processing network and having a first stream identifier. When a write request is received, memory 1012 is accessed to determine if any previous first write request with the same first stream identifier is pending. When a previous write request to the first stream identifier is pending, messaging logic 1014 sends a request for an ordered write to the Home Node via the second interface. However, when no previous write request to the first stream identifier is pending, messaging logic 1014 sends a request for an optimized write to the Home Node via second interface 1006.

As discussed above, messaging logic is also configured to respond to completion messages received at second interface 1006 and to send 'enable observation' messages to the Home Node via second interface 1006.

As used herein, the term processor, controller or the like may encompass a processor, controller, microcontroller unit (MCU), microprocessor, and other suitable control elements. It will be appreciated that embodiments described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a transmitter, a radio, signal drivers, clock circuits, power source circuits, and user input devices. As such, these functions may be interpreted as a method to perform functions in accordance with certain embodiments. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those skilled in the art will recognize that the present disclosure has been described in terms of exemplary embodiments based upon use of a programmed processor. However, the embodiments should not be so limited, since the embodiments could be implemented using hardware component equivalents such as special purpose hardware and/or dedicated processors which are equivalents as described and claimed. Similarly, general purpose computers, microprocessor based computers, micro-controllers, optical computers, analog computers, dedicated processors and/or dedicated hard wired logic may be used to construct alternative equivalent embodiments.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present invention. Such alternative storage devices should be considered equivalents.

Various embodiments described herein are implemented using programmed processors executing programming instructions that are broadly described in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the principles described herein. Error trapping can be added and/or enhanced and variations can be made in user interface and information presentation without departing from the disclosed embodiments. Such variations are contemplated and considered equivalent.

Accordingly, embodiments of the present disclosure advantageously provide a method and an apparatus for data transfer in a data processing network uses both ordered and optimized write requests. The embodiments described above and summarized below are combinable.

In one embodiment, a method of data transfer in a data processing network, the method includes: receiving a first write request at a first node of the data processing network, the write request directed to a first address in the data processing network and having a first stream identifier; determining, by the first node, if any previous write request with the same first stream identifier is pending; when a previous write request to the first stream identifier is pending, sending a request for an ordered write to a second node of the data processing network, where the second node is a Home Node for the first address; and when no previous write request to the first stream identifier is pending, sending a request for an optimized write to the second node of the data processing network associated with the first address.

In one embodiment, a method where the request for an ordered write indicates to the second node that the first node sends a message to the second node to enable observation of data associated with the write request when an ordered chain of write requests has been completed.

In one embodiment, where the request for an ordered write indicates that the second node should maintain a copy of the data until the message to enable observation is received or a cancellation message for the request is received.

In one embodiment, where the request for an ordered write comprises a request that indicates to the second node that the data to be written be treated in a manner similar to a request to write a partial cache line.

In one embodiment, a method further having the first node maintaining a record of write requests, where, for each received write request, the record of write requests comprises: a stream identifier of the received write request; a transaction identifier of a corresponding write request sent to the second node; and an indication of an order in which the write request was received at the first node.

In one embodiment, where, for each received write request, the record of write requests further comprises: an indication if a completion message has been received from the Home Node; and an indication if the second node expects a message to enable observation of data associated with the write to be received from the first node when an ordered chain of write requests older than the received write request has been completed.

In one embodiment, where indication of an order in which the write request was received at the first node comprises an identifier of a previous write request having the same stream identifier.

In one embodiment, a method further having: receiving, by the first node, a completion message from the second node indicative of completion of a request having a first transaction identifier; determining, from the record of write requests, if each older request having the same stream identifier as the request having the first transaction identifier has been completed; and when each older request having the same stream identifier as the request having the first transaction identifier has been completed, the first node sending to the second node a message to enable observation of data associated with the first address.

In one embodiment, a method further having: when each older request having the same stream identifier as the request having the first transaction identifier has been completed, the first node removing the request having the first transaction identifier from the record of write requests.

In one embodiment, a method further having: canceling, by the first node, a write request to the second node, the write request having a first transaction identifier; determining, by the first node, if a more recent write request with the same first stream identifier is pending; when a more recent write request with the same first stream identifier is pending: determining a transaction identifier of the more recent write request; and canceling, by the first node, the write request having the transaction identifier of the more recent write request.

In one embodiment, an apparatus includes: a network input node, where the network input node comprises: a first interface configured to receive first write requests from a first device, each first write request having a stream identifier where first write requests having the same stream identifier are received in order and each first write request targeted to an address in a data processing network; a second interface configured to couple to a second node of the data processing network and further configured to send second write requests, each second write request corresponding to a first write request to the second node and having a transaction identifier, where the second node is a Home Node for addresses in the data processing network; a memory configured to store a record of first and second write requests and an order of the first write requests; and messaging logic configured for: receiving a first write request from the first interface, the write request directed to a first address in the data processing network and having a first stream identifier; accessing the memory to determine if any previous first write request with the same first stream identifier is pending; when a previous write request to the first stream identifier is pending, sending a request for an ordered write to the second node via the second interface; and when no previous write request to the first stream identifier is pending, sending a request for an optimized write to the second node via the second interface.

In one embodiment, an apparatus further having the second node, where the second node provides a point of coherence in the data processing network for the first address, where the second node is configured for: receiving the ordered write request from the network input node, the order write request having a first transaction identifier; responsive to the ordered write request, obtaining and retaining a copy of data at the first address; receiving and retaining data associated with the write request from the first input node; and responsive to a message from the network input node to enable observation, making the data associated with the write request from the first input node observable in the data processing network.

In one embodiment, where the second node is further configured for: responsive to a cancelation message from the network input node, making the retained a copy of data at the first address observable in the data processing network.

In one embodiment, where the second node is further configured for, subsequent to obtaining and retaining a copy of data at the first address and receiving and retaining data associated with the write request from the first input node: sending a completion message to the network input node.

In one embodiment, where the messaging logic is further configured to: upon cancellation of a second write request: accessing the memory to determine if any more recent first write requests with the same first stream identifier are pending; and when at least one more recent first write request with the same first stream identifier are pending, cancelling the at least one more recent first write request.

In one embodiment, where the record of first and second write requests and the order of the first write requests is stored as a table, where an entry in the table for a received write request comprises: a stream identifier of the received write request; a transaction identifier of a corresponding write request sent to the second node; an indicator if the write request is a head of an ordered sequence of write requests; an indicator if the write request is a tail of an ordered sequence of write requests; an indicator of a previous write request, if any, in an ordered sequence of write requests; an indicator is completion message has been received from the second node for the corresponding write request sent to the second node; and an indicator if the corresponding write request sent to a second node was sent as an ordered write request for which a message to enable observation is expected or as an optimized write request for which no message to enable observation is expected.

In one embodiment, where the memory is a content addressable memory.

In one embodiment, an apparatus further having the second node, where the second node provides a point of coherence in the data processing network for the first address, where the first node and second node is configured to complete a sequence of ordered write requests before the associated data is made available to other elements of the data processing network.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims. The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

The invention claimed is:

1. A method of data transfer in a data processing network, the method comprising:
receiving a write request at a first node of the data processing network, the write request directed to a first address in the data processing network and having a first stream identifier;
determining, by the first node, if any previous write request with the same first stream identifier is pending;
when a previous write request to the first stream identifier is pending, sending a request for an ordered write to a second node of the data processing network, where the second node is a Home Node for the first address; and
when no previous write request to the first stream identifier is pending, sending a request for an optimized write to the second node of the data processing network.

2. The method of claim 1, where the request for an ordered write indicates to the second node that the first node sends a message to the second node to enable observation of data associated with the write request when an ordered chain of write requests has been completed.

3. The method of claim 2, where the request for an ordered write indicates that the second node should maintain a copy of the data until the message to enable observation is received or a cancellation message for the request is received.

4. The method of claim 1, where the request for an ordered write comprises a request that indicates to the second node that the data to be written is to be treated in a manner similar to a request to write a partial cache line.

5. The method of claim 1, further comprising the first node maintaining a record of write requests, where, for each received write request, the record of write requests comprises:
a stream identifier of the received write request;
a transaction identifier of a corresponding write request sent to the second node; and
an indication of an order in which the write request was received at the first node.

6. The method of claim 5, where, for each received write request, the record of write requests further comprises:
an indication if a completion message has been received from the Home Node; and
an indication if the second node expects a message to enable observation of data associated with the write request to be received from the first node when an ordered chain of write requests older than the received write request has been completed.

7. The method of claim 5, where indication of an order in which the write request was received at the first node comprises an identifier of a previous write request having the same stream identifier.

8. The method of claim 5, further comprising:
receiving, by the first node, a completion message from the second node indicative of completion of a request having a first transaction identifier;
determining, from the record of write requests, if each older request having the same stream identifier as the request having the first transaction identifier has been completed; and
when each older request having the same stream identifier as the request having the first transaction identifier has been completed, the first node sending to the second node a message to enable observation of data associated with the first address.

9. The method of claim 8, further comprising:
when each older request having the same stream identifier as the request having the first transaction identifier has been completed, the first node removing the request having the first transaction identifier from the record of write requests.

10. The method of claim 1, further comprising:
canceling, by the first node, a write request to the second node, the write request having a first transaction identifier;
determining, by the first node, if a more recent write request with the same first stream identifier is pending;
when a more recent write request with the same first stream identifier is pending:

determining a transaction identifier of the more recent write request; and canceling, by the first node, the write request having the transaction identifier of the more recent write request.

11. An apparatus comprising:

a network input node, where the network input node comprises:

a first interface configured to receive first write requests from a first device, each first write request having a stream identifier where first write requests having the same stream identifier are received in order and each first write request targeted to an address in a data processing network;

a second interface configured to couple to a second node of the data processing network and further configured to send second write requests, each second write request corresponding to a first write request to the second node and having a transaction identifier, where the second node is a Home Node for addresses in the data processing network;

a memory configured to store a record of first and second write requests and an order of the first write requests; and messaging logic configured for:

receiving a first write request from the first interface, the write request directed to a first address in the data processing network and having a first stream identifier;

accessing the memory to determine if any previous first write request with the same first stream identifier is pending;

when a previous write request to the first stream identifier is pending, sending a request for an ordered write to the second node via the second interface; and when no previous write request to the first stream identifier is pending, sending a request for an optimized write to the second node via the second interface.

12. The apparatus of claim 11, further comprising the second node, where the second node provides a point of coherence in the data processing network for the first address, where the second node is configured for:

receiving the ordered write request from the network input node, the ordered write request having a first transaction identifier;

responsive to the ordered write request, obtaining and retaining a copy of data at the first address;

receiving and retaining data associated with the write request from the first input node; and responsive to a message from the network input node to enable observation, making the data associated with the write request from the first input node observable in the data processing network.

13. The apparatus of claim 12, where the second node is further configured for:

responsive to a cancelation message from the network input node, making the retained copy of data at the first address observable in the data processing network.

14. The apparatus of claim 12, where the second node is further configured for, subsequent to obtaining and retaining a copy of data at the first address and receiving and retaining data associated with the write request from the first input node:

sending a completion message to the network input node.

15. The apparatus of claim 11, where the messaging logic is further configured to:

upon cancellation of a second write request:

accessing the memory to determine if any more recent first write requests with the same first stream identifier are pending; and when at least one more recent first write request with the same first stream identifier is pending, cancelling the at least one more recent first write request.

16. The apparatus of claim 11, where the record of first and second write requests and the order of the first write requests is stored as a table, where an entry in the table for a received write request comprises:

a stream identifier of the received write request;

a transaction identifier of a corresponding write request sent to the second node;

an indicator if the write request is a head of an ordered sequence of write requests;

an indicator if the write request is a tail of an ordered sequence of write requests;

an indicator of a previous write request, if any, in an ordered sequence of write requests;

an indicator is completion message has been received from the second node for the corresponding write request sent to the second node; and an indicator if the corresponding write request sent to a second node was sent as an ordered write request for which a message to enable observation is expected or as an optimized write request for which no message to enable observation is expected.

17. The apparatus of claim 11, where the memory comprises a content addressable memory.

18. The apparatus of claim 11, further comprising the second node, where the second node provides a point of coherence in the data processing network for the first address, where the first node and second node is configured to complete a sequence of ordered write requests before the associated data is made available to other elements of the data processing network.

* * * * *